(12) United States Patent
Anand et al.

(10) Patent No.: US 9,019,532 B2
(45) Date of Patent: Apr. 28, 2015

(54) DEVICE MESSAGING

(75) Inventors: Pankaj Anand, New Delhi Delhi (IN);
Laurent Pizot, Camas, WA (US);
Pankaj Sharma, New Delhi Delhi (IN);
Jacob Refstrup, Vancouver, WA (US)

(73) Assignee: Hewlett-Packard Development Company, Houston, TX (US)

( * ) Notice: Subject to any disclaimer, the term of this patent is extended or adjusted under 35 U.S.C. 154(b) by 0 days.

(21) Appl. No.: 13/636,361

(22) PCT Filed: Apr. 7, 2010

(86) PCT No.: PCT/US2010/030220
§ 371 (c)(1),
(2), (4) Date: Sep. 21, 2012

(87) PCT Pub. No.: WO2011/126479
PCT Pub. Date: Oct. 13, 2011

(65) Prior Publication Data
US 2013/0010333 A1    Jan. 10, 2013

(51) Int. Cl.
*G06F 3/12* (2006.01)
*H04L 29/08* (2006.01)
*H04L 29/06* (2006.01)
*G06F 9/54* (2006.01)

(52) U.S. Cl.
CPC .......... *H04L 67/2823* (2013.01); *G06F 3/1265* (2013.01); *G06F 3/1288* (2013.01); *H04L 69/08* (2013.01); *G06F 9/546* (2013.01); *G06F 9/547* (2013.01)

(58) Field of Classification Search
CPC ..... G06F 3/1265; G06F 3/1288; G06F 9/546; G06F 9/547

USPC ................... 358/1.1–1.9, 1.11–1.18
See application file for complete search history.

(56) References Cited

U.S. PATENT DOCUMENTS

| | | | |
|---|---|---|---|
| 6,564,337 B1 | 5/2003 | Yoneda et al. | |
| 6,757,741 B1 | 6/2004 | Hertling | |
| 7,111,060 B2 * | 9/2006 | Araujo et al. | 709/224 |
| 7,386,738 B2 | 6/2008 | Trappeniers et al. | |
| 7,730,339 B2 | 6/2010 | Wang | |
| 7,870,044 B2 | 1/2011 | Robertson | |

(Continued)

FOREIGN PATENT DOCUMENTS

| | | | |
|---|---|---|---|
| JP | 2007048031 A | | 2/2007 |
| WO | WO/2010/031310 | * | 3/2010 |
| WO | WO2010031310 | * | 3/2010 |

OTHER PUBLICATIONS

U.S. Appl. No. 13/749,341, filed Jul. 24, 2014, Pizot et al.

(Continued)

*Primary Examiner* — King Poon
*Assistant Examiner* — Ibrahim Siddo
(74) *Attorney, Agent, or Firm* — Hewlett-Packard Patent Department

(57) ABSTRACT

An apparatus includes a messaging client and a server. The messaging client is configured to receive, utilizing a first protocol, a first communication, extract a request from the first communication, and send, utilizing a second protocol, the request to the server. The server is configured to receive the request, return, utilizing the second protocol, a response to the messaging client; and forward a job instruction included in the request, The messaging client is also configured to send, utilizing the first protocol, a second communication that includes the response to a source of the first communication.

11 Claims, 5 Drawing Sheets

(56) References Cited

U.S. PATENT DOCUMENTS

| | | | |
|---|---|---|---|
| 8,019,829 | B2 | 9/2011 | Cocotis et al. |
| 8,223,355 | B2 | 7/2012 | McCoog et al. |
| 8,363,247 | B2 | 1/2013 | Butcher |
| 2001/0029531 | A1 | 10/2001 | Ohta |
| 2002/0046238 | A1* | 4/2002 | Estavillo et al. ............... 709/203 |
| 2002/0103853 | A1 | 8/2002 | Copp et al. |
| 2002/0131082 | A1 | 9/2002 | Al-Varez-Baron Stoof |
| 2002/0181010 | A1 | 12/2002 | Pineau |
| 2003/0078965 | A1 | 4/2003 | Cocotis et al. |
| 2004/0185882 | A1 | 9/2004 | Gecht et al. |
| 2005/0052694 | A1 | 3/2005 | Asano |
| 2005/0105127 | A1 | 5/2005 | Miwa et al. |
| 2005/0162685 | A1 | 7/2005 | Heiles et al. |
| 2005/0219612 | A1 | 10/2005 | Nakagawa |
| 2005/0273496 | A1 | 12/2005 | Jean et al. |
| 2006/0176504 | A1 | 8/2006 | Burke et al. |
| 2006/0250642 | A1 | 11/2006 | Trappe et al. |
| 2007/0016680 | A1 | 1/2007 | Burd et al. |
| 2007/0268518 | A1 | 11/2007 | Yokoyama |
| 2009/0011708 | A1 | 1/2009 | Kim et al. |
| 2010/0211698 | A1 | 8/2010 | Krishaswamy |
| 2010/0274848 | A1 | 10/2010 | Altmaier et al. |
| 2011/0022812 | A1 | 1/2011 | van der Linden et al. |
| 2011/0173324 | A1* | 7/2011 | Wang et al. .................... 709/225 |
| 2011/0235508 | A1 | 9/2011 | Goel et al. |
| 2013/0010333 | A1 | 1/2013 | Anand et al. |
| 2013/0060942 | A1 | 3/2013 | Ansari et al. |
| 2013/0103844 | A1 | 4/2013 | Bulut et al. |
| 2013/0111038 | A1 | 5/2013 | Girard |

OTHER PUBLICATIONS

Breuer, S. et al., UniFLOW, (Research Paper), Sep. 15, 2010, http://www.nt-ware.com/mom/5.0/eng/momuserdoc_en.pdf.

Wikipedia, "XMPP," XP002720778, Mar. 27, 2010, pp. 1-7, Retrieved from the Internet: http://en.wikipedia.org/w/index.php?title=XMPP&oldid=352338507.

Audet, Francois, and Cullen Jennings, "Network Address Translation (NAT) Behavioral Requirements for Unicast UDP," Network Working Group, RFC 4787, Jan. 2007, 21 pages.

Caituiro-Monge, H. et al., "Friend Relay: a Resource Sharing Framework for Mobile Wireless Devices," (Research Paper), Publicaiton Date: 2006; On pp. 20-29; found at http://nmsl.cs.ucsb.edu/papers/142.pdf.

Calderone et al., "[Twisted-web] Implementing hanging get with twisted web," (Web page), Nov. 11, 2006, <http://twistedmatrix.com/pipermail/twisted-web/2006-November/003140.html>.

Der-Chen Huang, "A low cost transparent traversal method for NAT," 2011 7th International Wireless Communications and Mobile Computing Conference (IWCMC), Jul. 4-8, 2011, pp. 671-676.

Extended European Search Report received in EP case 10849584.7, Feb. 21, 2014, 5 pages.

Fielding et al., "Principled Design of the Modern Web Architecture," ACM Transactions on Internet Technology, vol, 2, No. 2, May 2002, pp. 115-150, <http://www.ics.uci.edu/~taylor/documents/2002-REST-TOIT.pdf>.

Ford, Bryan, Pyda Srisuresh, and Dan Kegel, "Peer-to-Peer Communication Across Network Address Translators," USENIX Annual Technical Conference, General Track. 2005, 15 pages, found at http://www.bford.info/pub/net/p2pnat/index.html#sec-hairpin.

International Preliminary Report on Patentability received in PCT Application No. PCT/US2010/030220, Oct. 18, 2012, 6 pages.

International Search Report & Written Opinion received in PCT Application No. PCT/US2010/030220, Dec. 10, 2010, 3 pages.

Internet Architecture Board, "IAB Considerations for UNilateral Self-Address Fixing (UNSAF) Across Network Address Translation," Network Working Group, RFC 3424, Nov. 2002, <http://tools.ietf.org/html/rfc3424>.

K. Egevang, "The IP Network Address Translator (NAT) RFC 1631," IETF Network Working Group, May 1994, 8 pages.

Muller, A., Carle. G. and Klenk, A., "Behavior and Classification of NAT Devices and Implications for NAT Traversal," IEEE Network Special Issue on Implications and Control of Middleboxes, Oct. 2008, 6 pages.

Rob Mead, "HP invents printing for your mobile," TechRadar, Aug. 19, 2007, 11 pages, found at http://www.techradar.com/us/news/phone-and-communications/mobile-phones/computing-components/peripherals/hp-invents-printing-for-your-mobile-154475.

Rosenberg et al., "Session Traversal Utilities for NAT (STUN)," Network Working Group, RFC 5389, Oct. 2008, 36 pages, found at http://tools.ietf.org/html/rfc5387.

Rosenberg et al., "STUN—Simple Traversal of User Datagram Protocol (UDP) Through Network Address Translators (NATs)," Network Working Group, RFC 3489, Mar. 2003, 33 pages, found at http://tools.ietf.org/html/rfc3489.

Perez, S., "HP's CloudPrint Corning to BlackBerry," RedWrite, May 4, 2009, 4 pages, found at http://readwrite.com/2009/05/04/hps_cloudprint_coming_to_blackberry.

Srisuresh et al., "Traditional IP Network Address Translator (Traditional NAT)," Network Working Group, RFC 3022, Jan. 2011, 12 pages, found at http://tools.ietf.org/pdf/rfc3022.pdf.

Wang, Yong, "Man-in-the-middle Attack on BB84 Protocol and its Defense," 2009 2nd IEEE International Conference on Computer Science and Information Technology, 2009, pp. 438-439.

Wikipedia, "Polling (computer science)," Mar. 12, 2010, 1 page, found at http://web.archive.org/web/20100312231959/http://en.wikipedia.org/wiki/Polling_(computer_science).

XMPP Standards Foundation, "XMPP Technologies: Overview," Dec. 16, 2009, 1 page, found at http://web.archive.org/web/20091216030050/http://xmpp.org/tech/overview.shtml.

Yan, M. et al. "A New Method for Accessing Documents in Environments with Limited Connection Speed, Storage and Screen Space," (Research Paper), vol. 1, 2002, pp. 273-276, found at http://ieeexplore.ieee.org/Xplore/login.jsp?url=http://ieeexplore.ieee.org/iel5/8044/22221/01035771.pdf%3Farnumber%3D1035771&authDecision=203.

* cited by examiner

DEVICE MESSAGING

BACKGROUND

Jobs can be delivered to devices such as printers via a data network. In particular, a user delivers a document to a network service. The network service formats the document generating a job that is to be delivered to a particular network enabled device. Firewalls and other security measures prevent a network service from initiating the delivery of a job. However, since the device has no inherent knowledge of when a job is available, the device does not know how or when to request a job, so the device first inquires as to whether a job is ready.

The device may use polling or "hanging get" techniques to learn if a job is ready to be delivered. When polling, the device periodically sends a request to the network device to learn if a job is available, and the server responds. That response either indicates no job is available or, if available, the job is returned in the response. With "hanging get," the device sends a request to the network service. The service holds on to the request keeping the session open and responds only when a job is available. Or, if too much time elapses, the session times out forcing the device to send another hanging get request.

The polling approach consumes network bandwidth and network service resources when requests are made and no job is available. The bandwidth consumption becomes problematic when polling is implemented on a large scale, that is, when multiple device are polling the network simultaneously. Furthermore, polling results in a job delivery lag. In other words, a job is not delivered until the device sends its next scheduled polling request. The "hanging get" approach consumes resources of the network service especially when multiple devices are competing for those resources. In particular, the network service maintains a session or thread for each hanging get request.

DRAWINGS

DETAILED DESCRIPTION

Introduction: Various embodiments described below were developed in an effort to notify a device that job is available at a network service. In particular, the embodiments were developed to overcome disadvantages of techniques such as polling and "hanging get." Overcoming such disadvantages allow a network service to deliver jobs to devices on a larger scale than otherwise possible.

A "network service" refers to a server or collection of servers that are configured to communicate with a collection of devices to fulfill intended purposes. Such purposes include selectively communicating messages and jobs to the devices. The term "job" is used to refer to data that can be processed by a device to produce a desired result. A job may cause the device to identify and communicate state information. Such information can include the device's physical location, its current operational status, and even usage statistics. Where the device is a printer, a job may cause the device to produce printed output.

A "job instruction" as used herein refers to an instruction designed to cause a device to process a job. The job instruction may include the job itself or a reference, such as an URL, for retrieving the job. A job instruction can include or provide access to parameter settings that affect how the device processes a job. Parameter settings control options such as whether or not certain features are used when processing a job. Where the device is a printer, such features may include color printing, duplex printing, stapling, multiple copies, collating, and the like. When not included with job instruction itself, the parameter settings may instead be retrieved using a reference included in the job instruction. This may be the same reference used to retrieve the job.

The following description is broken into sections. The first, labeled "Environment," describes an exemplary environment in which various embodiments may be implemented. The second section, labeled "Components," describes examples of various physical and logical components for implementing various embodiments. The third section, labeled as "Operation," describes steps taken to implement various embodiments.

Figure 1:
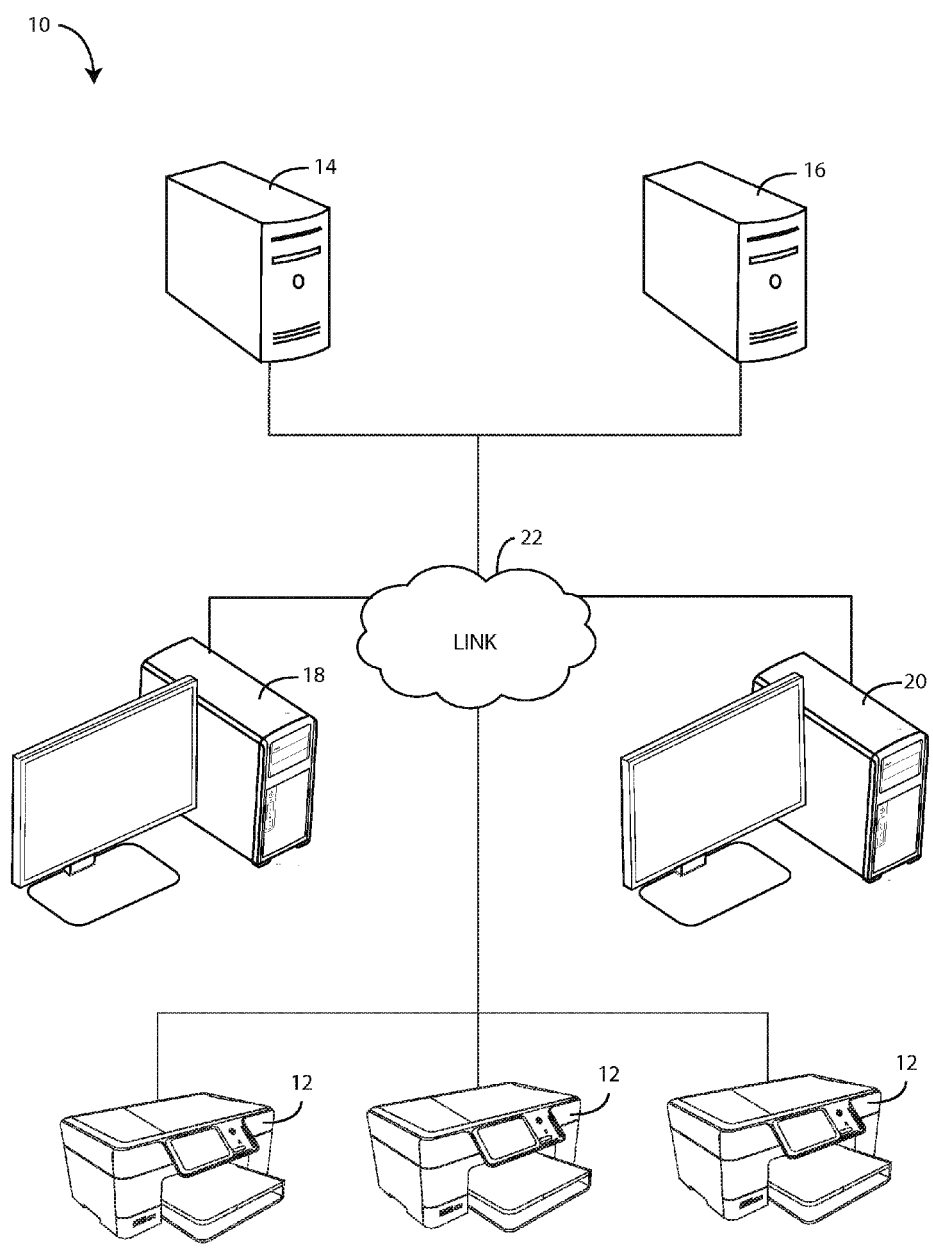
FIG. 1 depicts an exemplary environment in which various embodiments may be implemented.

Environment: FIG. 1 depicts an exemplary network 10 in which various embodiments may be implemented. Network 10 is shown to include devices 12, job service 14, messaging service 16, and clients 18 and 20. Devices 12 represent generally any devices capable of processing jobs received from job service 14. In the example of FIG. 1, devices 12 are shown as printers configured to produce printed output from print jobs. Job service 14 represents a network service configured to work with messaging service 16 to deliver jobs to devices 12. Messaging service 16 represents a network service configured to communicate messages to and receive messages from devices 12 for the purpose of enabling job delivery by job service 14.

Clients 18 and 20 each represent a computing device configured to interact with and direct job service 14 to cause a job to be delivered to a selected device 12. In an implementation discussed in more detail below, devices 12 are printers and client devices 16 and 18 are configured to instruct job service 14 to cause print jobs to be delivered. While network 10 is shown to include three printers 12, two clients 16 and 18, and two services 14 and 16, network 10 may include any number of such components. Furthermore, while services 14 and 16 are depicted as being distinct, services 14 and 16 may instead be implemented in a more integrated fashion. For example, job service 14 and messaging service may represent a common server or collection of servers configured to implement the specified functions.

Components 12-20 are interconnected via link 22. Link 22 represents generally one or more of a cable, wireless, fiber optic, or remote connections via a telecommunication link, an infrared link, a radio frequency link, or any other connectors or systems that provide electronic communication. Link 22 may include, at least in part, an intranet, the Internet, or a combination of both. Link 22 may also include intermediate proxies, routers, switches, load balancers, and the like. The paths followed by link 22 between components 12-20 as depicted in FIG. 1 represent the logical communication paths between these devices, not necessarily the physical paths between the devices.

Figure 2:
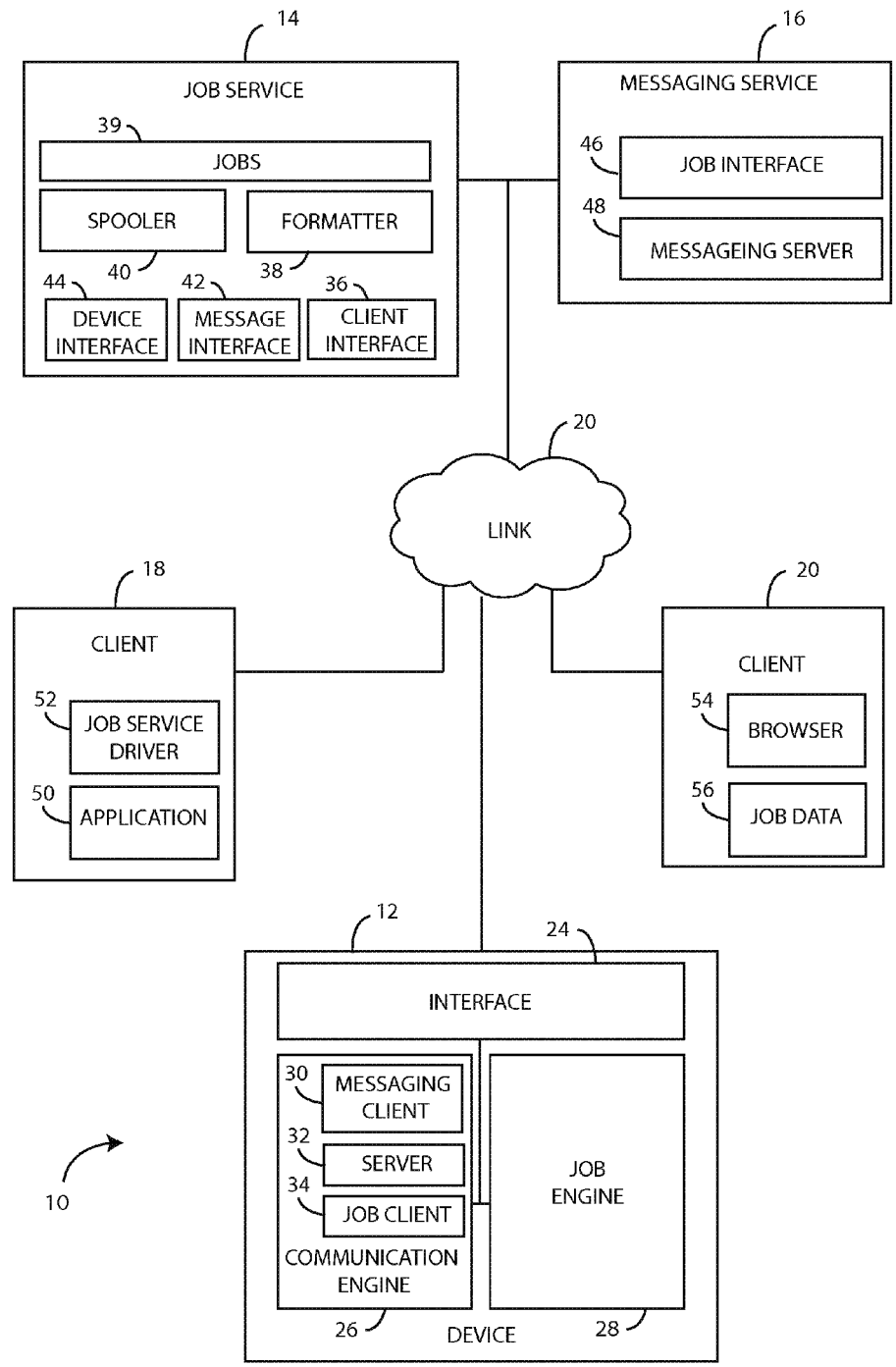
FIG. 2 depicts example and various physical and logical components for implementing various embodiments.

Components: FIG. 2 depicts various physical and logical components for implementing various exemplary embodiments. In FIG. 2, device 12 is shown to include interface 24, communication engine 26, and job engine 28. Interface 24 represents generally any combination of hardware and programming configured to receive communications from and pass communications to via link 20. In particular, interface 24 may include one or more physical ports such as a wired or wireless network port via which communications may be sent and received on more than one data channel. As discussed below, one such channel may be used for communications of a first protocol such as XMPP (Extensible Messaging and Presence Protocol) and another data channel may be used for communications of a second protocol such as HTTP (Hypertext Transport Protocol).

Communication engine 26 represents generally any combination of hardware and programming configured to process communications received via interface 24 and to generate communications to be sent via interface 24. As addressed in more detail below, communication engine 26 is responsible for processing and generating communications of different types received and sent on different data channels using different protocols. In particular, through those communications, communication engine 26 is operable to retrieve and pass a job to job engine 28, Job engine 28 represents generally any combination of hardware and programming configured to process a job received from communication engine 26 to achieve an intended result. For example, where device 12 is a printer and the job is a print job, job engine 28 is responsible for processing the print job to produce printed output. In this example, job engine 28 would include components to deposit imaging material such as ink or toner onto a media sheet.

In FIG. 2, communication engine 26 is shown to include messaging client 30, server 32, and job client 34. Messaging client 30 represents generally any combination of hardware and programming configured to communicate with messaging service 16 using a first protocol, In particular, messaging client 30 receives, utilizing the first protocol, a first communication from messaging service 16, extracts a request from the communication, and sends, utilizing a second protocol, the request to server 32. The request includes a job instruction to be processed by server 32. As noted above that first protocol may be XMPP while the second protocol is HTTP. Messaging client 34 is configured to receive the first communication without having first requested it, Messaging client 34 is also configured to send, utilizing the first protocol, a second communication to messaging service 16—the source of the first communication. That second communication includes a response received from server 32 and is a response to the request extracted from the first communication, Server 32 represents generally any combination of hardware and programming configured to receive the request from messaging client 30, process the request, and return a response to messaging client 30 using the second protocol. In processing the request, server 32 forwards the job instruction included in the request to job client 34. To generate the response, server 32 may communicate with job engine 28 or job client 34 to obtain information related to the state of job engine 28. Where device 12 is a printer, such state information can include consumable levels and usage, successful receipt of a job instruction, successful completion of a print, and any other information relative to the state of job engine 28. Server 32 can then include the state information in the response.

Job client 34 represents generally any combination of hardware and programming configured to process a job instruction received from server 32. A job instruction, for example, may be or include a reference such as an URL (Uniform Resource Locator) for use in retrieving a job from job service 14. In such a case, job client 34 is responsible for using the reference to send a communication utilizing via interface 24 utilizing the second protocol, HTTP in the above example. That communication includes a request to retrieve a job identified by the reference from job service 14. In response to that request, job client 34 receives the job and passes it to job engine 28 for processing. Where the job is a print job, job engine 28 produces printed output. The job instruction may also include parameter settings. Here, job client 34 passes those setting to job engine 28 for use in processing the job.

Messaging client 30 communicates with messaging service 16 via the first protocol with communications passing over a first data cannel. Job client 34 communicates with job service 14 via a second protocol with communications passing over a second, different data channel. The first and second protocols are different in that an external communication (a communication form messaging service 16) can be sent to messaging client 30 without messaging client 30 having first requested that communication, A protocol such as XMPP can serve as the first protocol. On the other hand, an external communication sent from job service 14 to job client 34 is first requested by job client 34. Thus, HTTP can serve as the second protocol.

In a given implementation, a job may be included in a job instruction. In this case, job client 34 may not communicate with job service 14 directly, but instead extract the job from the job instruction and forwarding the job on to job engine 28. Where, for example, device 12 is a printer, the extracted job can be a print job processed to produce printed output.

Job service 14 is shown to include client interface 36, formatter 38, jobs 39, spooler 40, message interface 42, and device interface 44. Client interface 36 represents generally any combination of hardware and programming configured to receive data from clients 18 and 20. In general, this data is related to a job that is to be delivered to device 12. Where device 12 is a printer, the data includes a document. Formatter 38 represents generally any combination of hardware and programming configured to process the data received from clients 18 and 20 to generate jobs 39. Where device 12 is a printer, formatter 38 formats the data to create print jobs. Such may include formatting into a format compatible for printing by device 12 or digital archiving for later access and printing, Exemplary formats include Post Script, PDL (Page Description Language), and PDF (Portable Document Format).

Spooler 40 represents generally any combination of hardware and programming configured to act as a queue for jobs 39 and to release jobs 39 when requested by device 12. Message interface 42 represents generally any combination of hardware and programming configured to notify messaging service 16 when a job is ready to be delivered. That notification includes a reference for requesting the job and it also identifies device 12. In particular, the notification can take the form of a request, an HTTP request to be issued to server 32. Message interface is also responsible for receiving responses to such requests from messaging service 16. Device interface 44 represents generally any combination of hardware and programming configured to receive requests from job client 34. The request includes a reference such as an URL. Device interface 44 then works with spooler 40 to return a job identified by the reference.

Messaging service 16 is shown to include job interface 46 and messaging server 48. Job interface represents generally any combination of hardware and programming configured to receive requests from and return responses to message interface 42. Messaging server 48 any combination of hardware and programming configured to send communications to and receive communications from messaging client 30. As noted, those communications are of a first protocol that allows messaging server to send a communication to messaging client 30 without having first received a request for the communication.

Communications sent to messaging client 30 include requests received from job service 14. As noted, such requests can include a job instruction that in turn can include a reference for retrieving a job held by spooler 40. In particular, messaging server 48 wraps the request in a communication and sends that communication to device 12 where it is received by messaging client 30. Such may, for example, be accomplished by wrapping the request in an XMPP message. Messaging server 48 is also responsible for receiving communications back from messaging client 30, A received communications may, for example, be a response wrapped in an XMPP message. That response would be a response to a request included in an XMPP message previously delivered to device 12.

Client 18 is shown to include application 50, job service driver 52, and network interface 54. Application 50 and job service driver 52 operate in conjunction to create and deliver job data to job service 14 for use by job service 14 to create a job to be delivered to device 12. Client 20 is shown to include browser 54 and job data 56. Here browser 54, with or without the aid of an extension, functions to upload job data 56 to job service 14. Where device 12 is a printer such job data may include a document to be formatted by job service 14 into a print job and then delivered to device 12 to be printed.

In foregoing discussion, various components were described as combinations of hardware and programming. Such components may be implemented in a number of fashions. In one example, the programming may be processor executable instructions stored on tangible memory media and the hardware may include a processor for executing those instructions. Thus, certain elements operating on the same device may share a common processor and common memory media.

Figure 3:
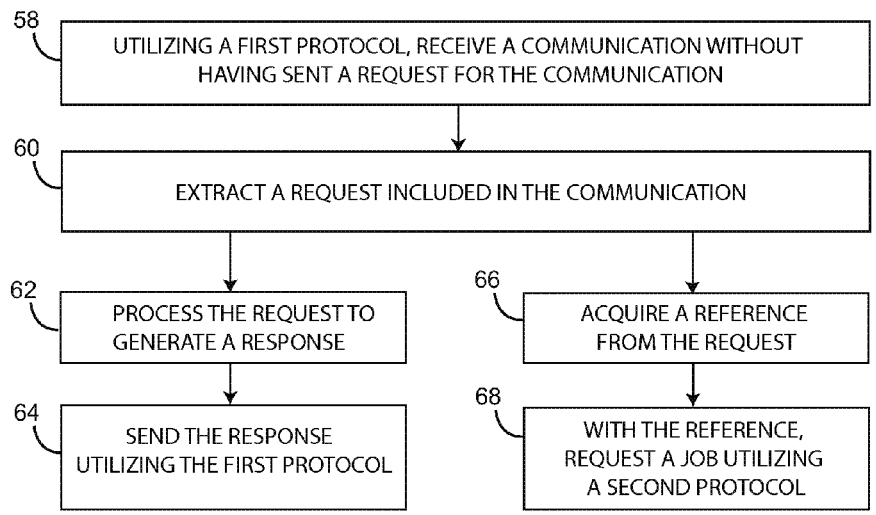
FIGS. 3-7 are exemplary flow diagrams depicting steps taken to implement various embodiments.
Figure 4:
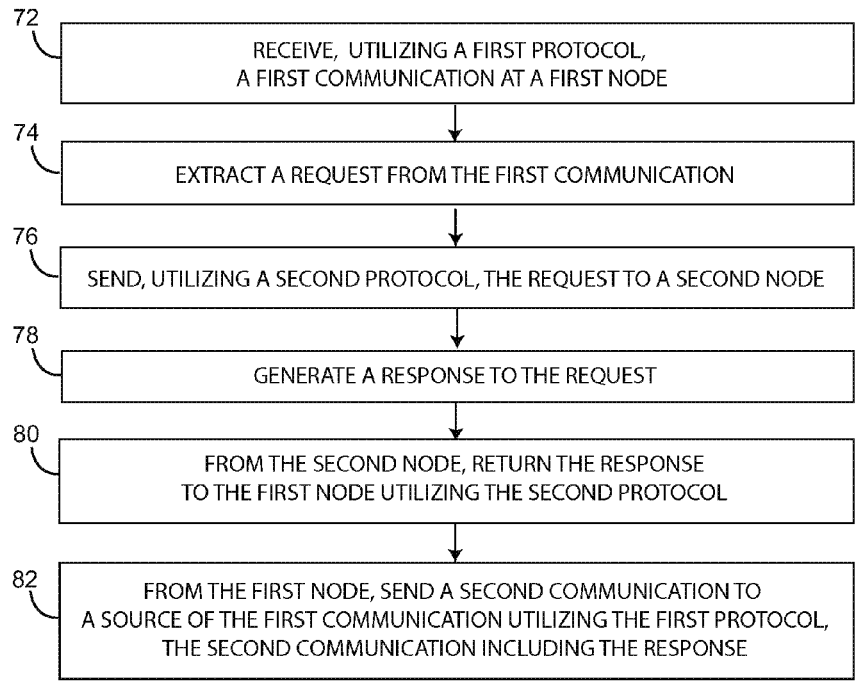
Figure 5:
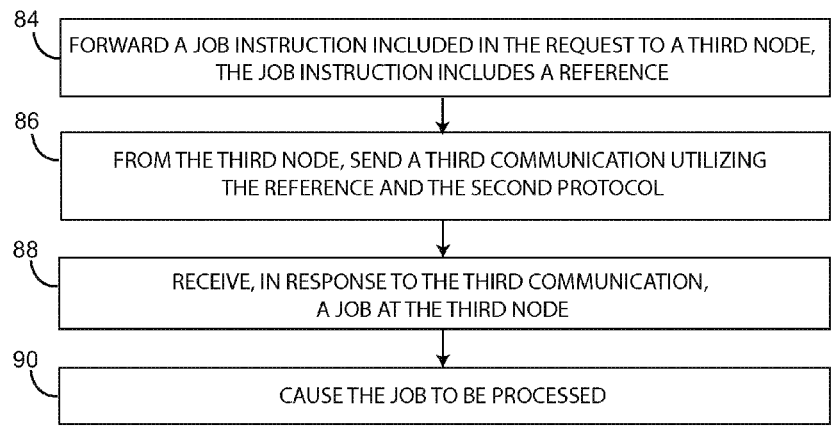
Figure 6:
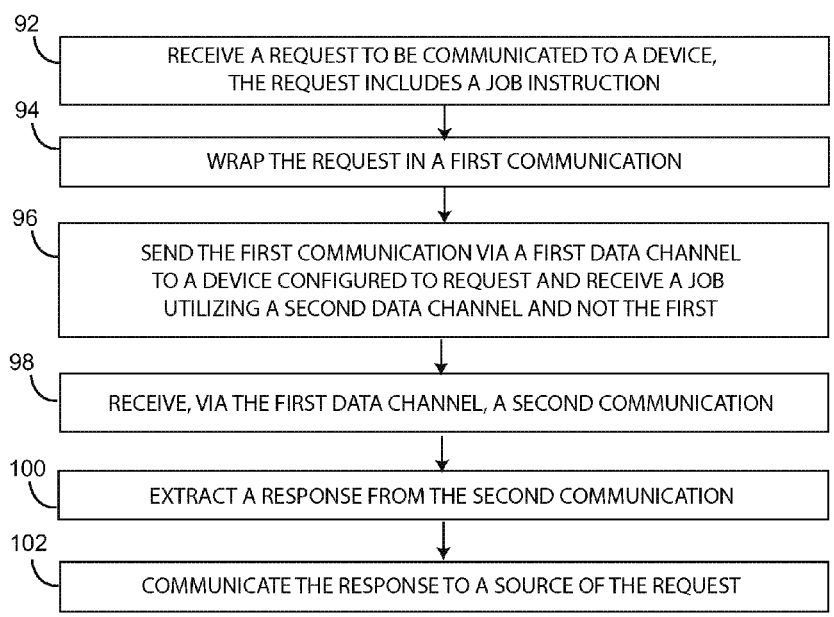
Figure 7:
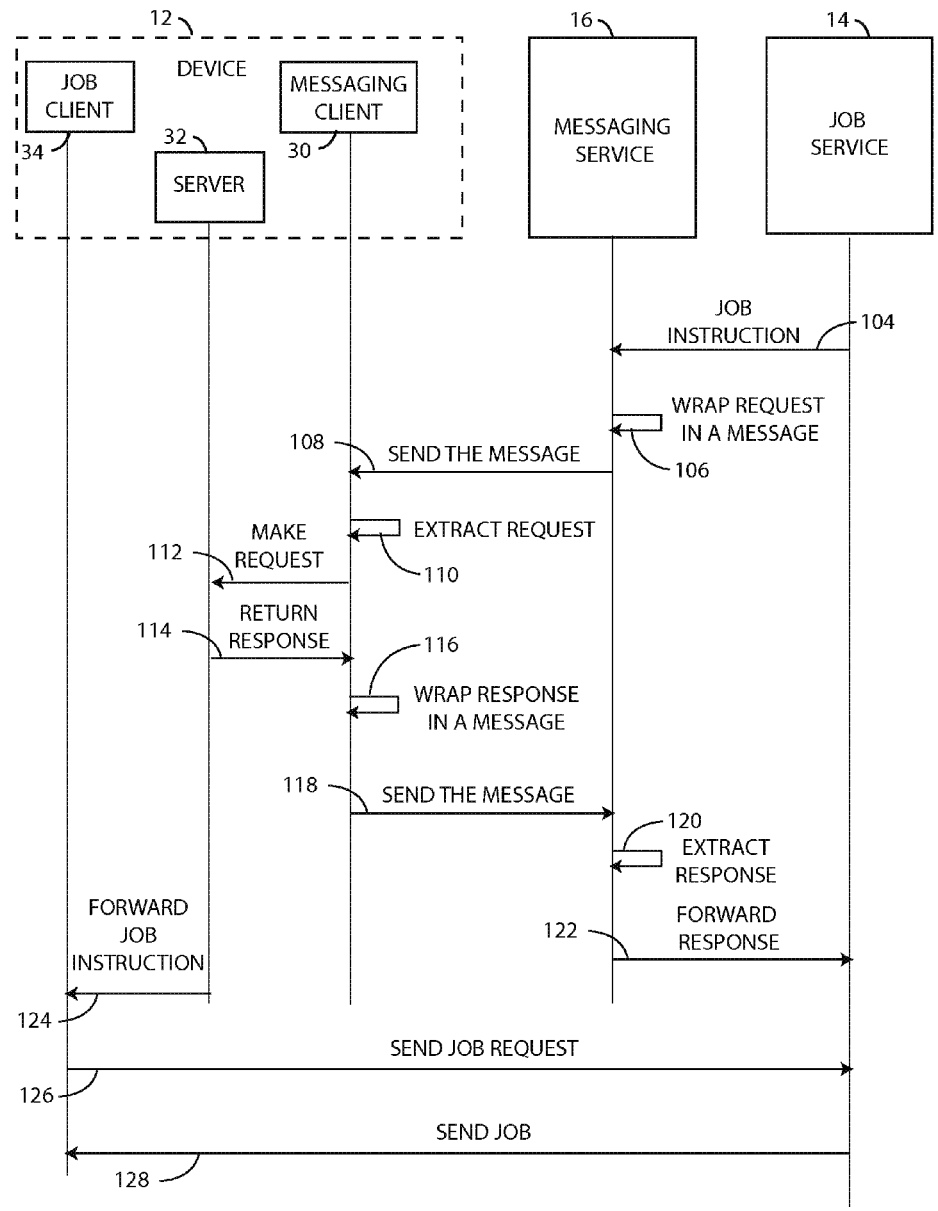

Operation: FIGS. 3-7 are exemplary flow diagrams of steps taken to implement various embodiments. In discussing FIGS. 3-7, reference may be made to the diagrams of FIGS. 1-2 to provide contextual examples. Implementation, however, is not limited to those examples. FIGS. 3-4, and 5 depict a workflow from the perspective of a device (such as device 12). FIG. 6 depicts steps taken from the perspective of network service such as messaging service 14. FIG. 7 depicts a workflow from a system wide perspective.

Starting with FIG. 3, a communication is received utilizing a first protocol (step 58). That communication is received at the device without the device having first requested the communication. A request is encoded in the communication. For example, the communication may be an XMPP message wrapping the request. The request is extracted from the communication (step 60). Referring to FIG. 2, the communication of step 58 is received at device 12 by messaging client 30. Messaging client 30 is also responsible for extracting the request in step 60.

Following step 60, the process can, if appropriate, split into two threads. The first thread includes steps 62 and 64 while the second thread includes steps 66 and 68. In the first thread, the request extracted in step 60 is processed to generate a response (step 62). Utilizing the first protocol, that response is returned to a source of the communication received in step 58. Referring to FIG. 2, server 32 is responsible for processing the request and generating the response in step 62, while messaging client 30 is responsible for sending the response in step 64.

In a further example, the request extracted in step 60 can include a request for state information. Thus, step 62 would include generating a response that includes the requested state information, Referring to FIG. 2, in generating the response, server 32 communicates with job engine 28 to obtain the state information. Where device 12 is a printer, such state information may include consumable levels and usage and the status of a particular print job or jobs being processed by job engine 28.

Moving to the second thread, a reference, if present, is acquired from the request extracted in step 60 (step 66). As noted, the reference may be an URL, identifying a network location from which a job may be retrieved. With the reference, a job is requested utilizing a second protocol (step 68). The second protocol is different than the first protocol utilized in steps 58 and 64. As noted above, the second protocol may be HTTP. Referring to FIG. 2, server 32 is responsible for acquiring the reference in step 66 while job client 34 is responsible for using the reference to request the job in step 68.

FIG. 4 depicts an exemplary expansion of steps 58-64 of FIG. 3, while FIG. 5 expands on steps 66 and 68. Referring first to FIG. 4, utilizing a first protocol, a first communication is received at a first node (step 72). A request is extracted from the first communication (step 74). That request is sent to a second node utilizing a second protocol (step 76). Referring to FIG. 2, messaging client 30 functions as the first node, extracts the request, and sends the response to server 32 which acts as the second node. Again, the first protocol allows the request to be received without having first been requested. XMPP is such a protocol. The second protocol may be HTTP.

A response to the request is generated (step 78). From the second node, the response is returned to the first node utilizing the second protocol (step 80). From the first node, a second communication is sent to a source of the first communication utilizing the first protocol (step 82). Referring to FIG. 2, server 32 functions as the second node and is responsible for steps 78 and 80. Messaging client 30 serves as the first node and is responsible for step 80. In particular, messaging client 30 wraps the response in the second communication, which, as noted, may be an XMPP message.

The request sent to the second node in step 76 may include a request for state information. Thus, step 78 would include generating a response that includes the requested state information. Referring to FIG. 2, in generating the response, server 32 communicates with job engine 28 to obtain the state information. Where device 12 is a printer, such state information may include consumable levels and usage and the status of a particular print job or jobs being processed by job engine 28.

The request sent to the second node in step 76 may include a job instruction. As noted a job instruction can include one or both of a reference and parameter settings for guiding device operation. Moving to FIG. 5, the job instruction is forwarded to a third node (step 84), From the third node, a third communication is sent utilizing a reference from the job instruction and the second protocol (step 86). Referring to FIG. 2, job client 34 functions as the third node and uses the reference to request the job. In the example FIG. 2, the reference may be an URL via which job client 34 can retrieve a job from job service 14 using an HTTP request. In response to the third communication, a job is received (step 88). The received job is a job identified by the reference. The job is caused to be processed (step 90). Referring to FIG. 2, job client 34 is responsible for steps 88 and 90. For example, where device 12 is a printer, job client 34 receives the print job from job service 14 and passes the print job to job engine 28 causing job engine to process the print job. As discussed above, the job may be included as part of the job instruction. In such a case, the job is extracted following step 84 and then caused to be processed in step 90 skipping steps 86 and 88.

In addition to the reference, the job instruction forwarded in step 84 may include parameter settings. Were, for example, device 12 is a printer, such parameter settings may be printer settings that control options such as whether or not certain features are used. Such features may include color printing, duplex printing, stapling, multiple copies, collating, and the like. Still referring to FIG. 2, job client 34 may be responsible for passing those parameter settings to job engine 28 so that the job caused to be processed in step 90 is processed using those parameter settings.

FIG. 6, as noted, depicts steps taken from the perspective of a network service such as messaging service 14 of FIGS. 1 and 2. In FIG. 6, a request to be communicated to a device is received (step 92). That request includes a job instruction. In the example of FIG. 2, messaging service 16 receives the request is received from job service 14. The request is wrapped in a first communication (step 94). In the examples above, that first communication may be an XMPP message. The first communication is sent to a device via a first data channel (step 96). That device is configured to request and receive a job referenced in the request via a second data channel different than the first. The first communication is sent without first having received a request for the first communication or the job instruction.

A second communication is received from the device via the first data channel (step 98). A response is extracted from the second communication (step 100). The response is communicated to a source of the request received in step 92 (step 102). Referring to FIG. 2 messaging service 16 receives the second communication and extracts the response in steps 98 and 100. Messaging service 16 then returns the response to job service 14.

Referring to FIG. 2, where device 12 is a printer, the printer's internal server is the intended recipient of the request wrapped in the first communication. The request can include a job instruction that in turn includes one or both of a reference for retrieving a print job and print parameter settings for device 12. The device can use the reference to retrieve a job from print service 14 using the reference and adjust parameters using the supplied settings. The request may also include a request for state information. The device can obtain the requested state information and generate an appropriate response to be communicated in step 102. Such state information can include printer consumable levels and usage as well as the status of one or more print jobs.

Communications on the first data channel are sent and received utilizing a first protocol while communications on the second data channel are sent and received using a second protocol. The first protocol, as noted above, may be XMPP while the second protocol may be HTTP. Referring to FIG. 2, messaging service 16 uses that first data channel to, in effect, notify device 12 that a job is ready to be retrieved from job service 14. Device 12 then utilizes the second data channel to retrieve the job from job service 14. Beneficially, messaging service 16 can send the first communication without waiting for a request from device 12.

FIG. 7 depicts a workflow from a system wide perspective. That system includes job service 14, messaging service 16, messaging client 30, server 32, and job client 34. It is noted that components 30, 32, and 34 are components of device 12. In the example of FIG. 7, messaging service 16 functions as an XMPP server while messaging client is an XMPP client. Further, server 32 functions as an LEDM (Low End data Model) REST (Representational State Transfer) interface. Messaging client 30 can establish a persistent XMPP connection with messaging service 16. Via this connection, device 12 can be notified that a job is available for retrieval from job service 14. Additionally, device 12 can quickly provide print service 14 with job status information.

In an exemplary embodiment, messaging client 30 implements XMPP core-stack (RFC 3920, 3921) and IBS (In-Band Binary) protocol (XEP 0047). Messaging service 16 hosts XMPP server clusters with which device 12 and other like devices communicate. Each node in the XMPP server cluster hosts an internal component with which device 12 or another device communicates using XMPP messages. The content of the XMPP messages communicated between device 12 and messaging server 16 are LEDM REST requests and responses which allow device 12 and print service 14 conform to a common contract of communication.

When device 12 is powered on for the first time, it prompts a user to enable communication with print service 14. If the user agrees, device 12 registers itself with messaging service 16 using, for example, a REST API (Application Program Interface) over TLS (Transport Security Layer). Messaging service 16 creates an XMPP account for device 12 and assigns a new client-id and a password to device 12. Messaging service 16 also provides connection details like the host name and client-id for messaging service 16 and a list of ports along with their priority. Messaging client 30 may maintain an XMPP roster or "buddy list." The roster may be kept empty to avoid overhead involved with communicating presence information.

Device 12 tries to connect to messaging service 16 on its default port, 5222 for example. In case the connection is not successful, possibly because of firewall restrictions, it re-tries using fallback ports such as 5223, 80 and 443 in order of priority. If the connection is successful, messaging client 30 logs in to messaging service 16 using its client-id and password received during registration. All XMPP communications may happen over TLS between the messaging client 30 and messaging service 16 to help ensure data integrity and to hide sensitive or personal information.

On successful login, device 12 is deemed ready to accept jobs from job service 14. Note that device 12 creates only one TCP (Transmission Control Protocol) connection with messaging service 16 and multiple IBB sessions to send and receive messages in parallel over the TCP connection. One IBB session can be used for LEDM requests and responses and another can be used by device 12 to send job and device events to messaging service 16. This separation allows different types of messages to be served by different components of messaging service 16.

In the following discussion, device 12 is a printer and job service 14 is responsible for delivering print jobs. Initially a user uploads a document and any parameter settings to job service 14. Job service 16 renders the document into a print job for printer 12. The print job conforms to a particular format such as PCL (Printer Control Language) designed for printer 12. The print job is now ready to be sent to device 12 along with any parameter settings.

Job service 14 communicates a job instruction to messaging service (step 104). Step 104, in this example, is accomplished by communicating an LEDM REST request using HTTP. That request includes the job instruction. The job instruction includes an URL for retrieving the print job and any parameter settings. Messaging service 16 wraps the LEDM REST request in an XMPP message (step 106) and sends the XMPP message to messaging client 30 (step 108).

Messaging client 30 extracts the LEDM REST request from the XMPP message (step 110). Messaging client 30 then makes an HTTP request of server 32 using the extracted LEDM REST request (step 112). Server 32 processes the LEDM REST request and returns an HTTP response (step 114). As noted above, where the LEDM REST request includes a request for state information, the response can include the requested state information. Messaging client 30 receives and wraps the response in an XMPP message (step 116) and sends the XMPP message to messaging service (step 118). Messaging service 16 extracts the response from the XMPP message sent in step 118 (step 120) and forwards the response to job service 14.

The request made of server 32 in step 112 includes the job instruction. Server 32 forwards the job instruction to job client 34. Job client 34 uses the URL included in the job instruction to make an HTTP request for the print job from job service 14 (step 126). In response, job service 14 returns the print job in an HTTP response (step 128). Job client 34 then causes device 12 to produce the print job using any parameter settings included in the job instruction.

All LEDM REST requests and responses are communicated via XMPP messages via an XMPP channel. Each XMPP message is sent without first receiving a request for the message or its contents. Print job data is not sent on this channel instead, as noted, the print jobs are communicated via an HTTP channel as a response to an HTTP request. The communication on the XMPP channel is kept very light which allows each XMPP server cluster (within messaging service 16) to handle thousands of printers or more.

Conclusion: The diagrams of FIGS. 1-2 show the architecture, functionality, and operation of various embodiments. Various components illustrated in FIG. 2 are defined at least in part as programs. Each such component, portion thereof, or various combinations thereof may represent in whole or in part a module, segment, or portion of code that comprises one or more executable instructions to implement any specified logical function(s). Each component or various combinations thereof may represent a circuit or a number of interconnected circuits to implement the specified logical function(s).

Also, the present invention can be embodied in any computer-readable media for use by or in connection with an instruction execution system such as a computer/processor based system or an ASIC (Application Specific Integrated Circuit) or other system that can fetch or obtain the logic from computer-readable media and execute the instructions contained therein. "Computer-readable media" can be any media that can contain, store, or maintain programs and data for use by or in connection with the instruction execution system. Computer readable media can comprise any one of many physical media such as, for example, electronic, magnetic, optical, electromagnetic, or semiconductor media. More specific examples of suitable computer-readable media include, but are not limited to, a portable magnetic computer diskette such as floppy diskettes or hard drives, a random access memory (RAM), a read-only memory (ROM), an erasable programmable read-only memory, or a portable compact disc.

Although the flow diagrams of FIG. 3-7 show specific orders of execution, the orders of execution may differ from that which is depicted. For example, the order of execution of two or more blocks may be scrambled relative to the order shown. Also, two or more blocks shown in succession may be executed concurrently or with partial concurrence. All such variations are within the scope of the present invention.

The present invention has been shown and described with reference to the foregoing exemplary embodiments. It is to be understood, however, that other forms, details and embodiments may be made without departing from the spirit and scope of the invention that is defined in the following claims.

What is claimed is:

1. An apparatus comprising:
a messaging client;
a job client; and
a server;
the messaging client to:
  establish a persistent connection with a source that is provided with or as part of a job service;
  receive a first communication over the persistent connection, the first communication being generated under a first protocol that provides for the messaging client to receive the first communication without the messaging client having made a request for the first communication;
  extract a request from the first communication, the request being generated under a second protocol and including a job instruction embodied in the request for a corresponding job received at the job service, the second protocol providing for client and server type communications; and
  forward the request generated by the job service under the second protocol to the server;
wherein the server is to:
  receive the request;
  provide a response to the request of the first communication, the response being generated under the second protocol; and
  forward the job instruction to the job client;
wherein the messaging client is to wrap the response generated under the second protocol as a second communication, the second communication being generated under the first protocol and being sent to the source of the first communication; and
wherein the job client is to send, based on the job instruction, a request to the job service for job data when the job service is able to process job data for the corresponding job, without the job client polling the job service or waiting for the job service to receive the corresponding job.

2. The apparatus of claim 1, wherein:
the source of the first communication is a messaging service.

3. The apparatus of claim 1, wherein:
the request of the first communication includes a request for state information;
the server is to obtain the requested state information; and
the response provided to the messaging client includes the requested state information.

4. The apparatus of claim 2, further comprising a job engine to process the job data to produce a printed image on a print medium.

5. The apparatus of claim 4, wherein:
the messaging client is to communicate with the messaging service on a first data channel and to receive the first communication via the first data channel without having requested the first communication; and
the job client is to communicate with the job service on a second data channel, to send the job request via the second data channel, and, in response to the job request, receive the job from the job service via the second data channel.

6. The apparatus of claim 5, wherein the first protocol is XMPP (Extensible Messaging and Presence Protocol) and the second protocol is HTTP (Hypertext Transport Protocol).

7. A computer-implemented method comprising:
establishing a persistent connection with a source that is provided with or part of a job service;

receiving a first communication over the persistent connection, the first communication being generated under a first protocol that provides for the messaging client to receive the first communication without the messaging client having made a request for the first communication;

extracting a request from the first communication, the request being generated under a second protocol and including a job instruction embodied in the request for a corresponding job received at the job service, the second protocol providing for client and server type communications;

generating a response to the request of the first communication, the response being generated under the second protocol;

wrapping the response generated under the second protocol as a second communication that is generated under the first protocol, the second communication being sent to the job service;

sending, based on the job instruction, a request to the job service for job data when the job service is able to process job data for the corresponding job, without polling the job service or waiting for the job service to receive the corresponding job.

8. The method of claim 7, wherein receiving the first communication comprises receiving without having first received a request for the first communication.

9. The method of claim 7, wherein the source of the first communication is a messaging service.

10. The method of claim 7, wherein the request of the first communication includes a request for state information and wherein the response includes the requested state information.

11. The method of claim 7, wherein the job instruction includes a uniform resource locator for accessing a job from the job service.

* * * * *

UNITED STATES PATENT AND TRADEMARK OFFICE
CERTIFICATE OF CORRECTION

PATENT NO. : 9,019,532 B2  Page 1 of 1
APPLICATION NO. : 13/636361
DATED : April 28, 2015
INVENTOR(S) : Pankaj Anand et al.

It is certified that error appears in the above-identified patent and that said Letters Patent is hereby corrected as shown below:

On the title page, item 75

Inventors, in column 1, line 1, delete "New Delhi Delhi" and insert -- New Delhi --, therefor.

Inventors, in column 1, line 3, delete "New Delhi Delhi" and insert -- New Delhi --, therefor.

Signed and Sealed this
First Day of March, 2016

Michelle K. Lee
*Director of the United States Patent and Trademark Office*